United States Patent [19]

Schloemer

[11] Patent Number: 5,067,172

[45] Date of Patent: Nov. 19, 1991

[54] AIR TO GROUND COMMUNICATIONS SYSTEM AND METHOD

[76] Inventor: Gerald R. Schloemer, Edwards Subdivision, P.O. Box 307, Round Lake, Ill. 60073

[21] Appl. No.: 358,147

[22] Filed: May 30, 1989

[51] Int. Cl.⁵ .............................................. H04Q 7/00
[52] U.S. Cl. ........................................ 455/34; 455/54
[58] Field of Search ...................... 455/33, 34, 54, 56, 455/67; 379/59, 60, 63

[56] References Cited

U.S. PATENT DOCUMENTS

| | | | |
|---|---|---|---|
| 4,794,635 | 12/1988 | Hess | 455/33 |
| 4,951,279 | 8/1990 | Hotta | 455/34 |
| 4,965,850 | 10/1990 | Schloemer | 455/33 |

Primary Examiner—Curtis Kuntz
Attorney, Agent, or Firm—Leo J. Aubel

[57] ABSTRACT

An air-to-ground communications system wherein the communicating frequency channels are assigned dependent on the amplitude of the signals received at the base sites and dependent on the altitude of the aircraft.

3 Claims, 1 Drawing Sheet

INVERTED CONE

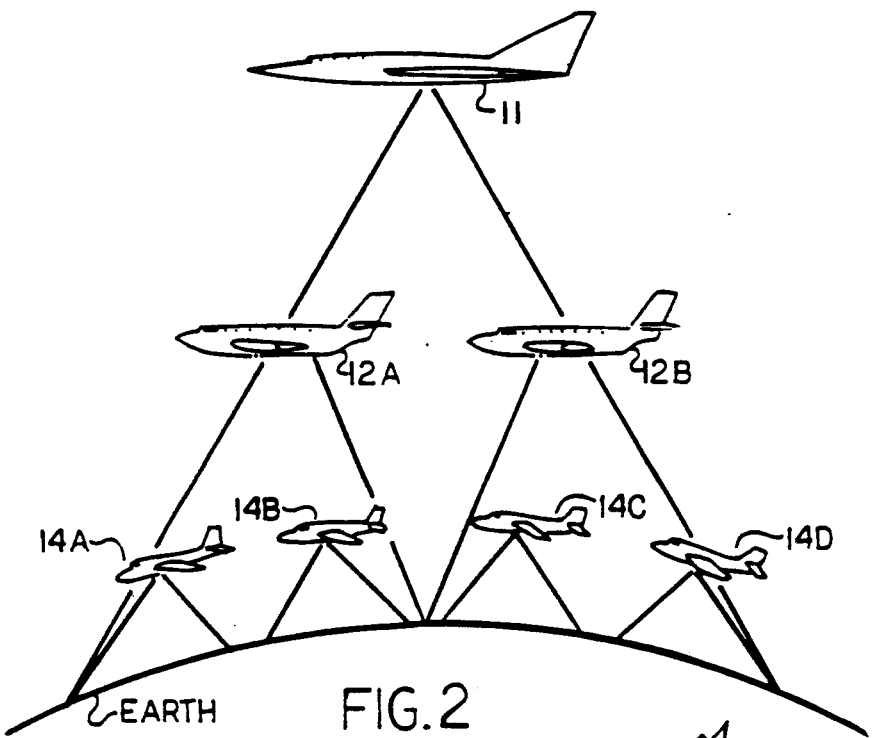
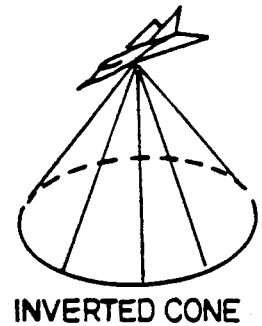
FIG. 2
FIG. 1
INVERTED CONE
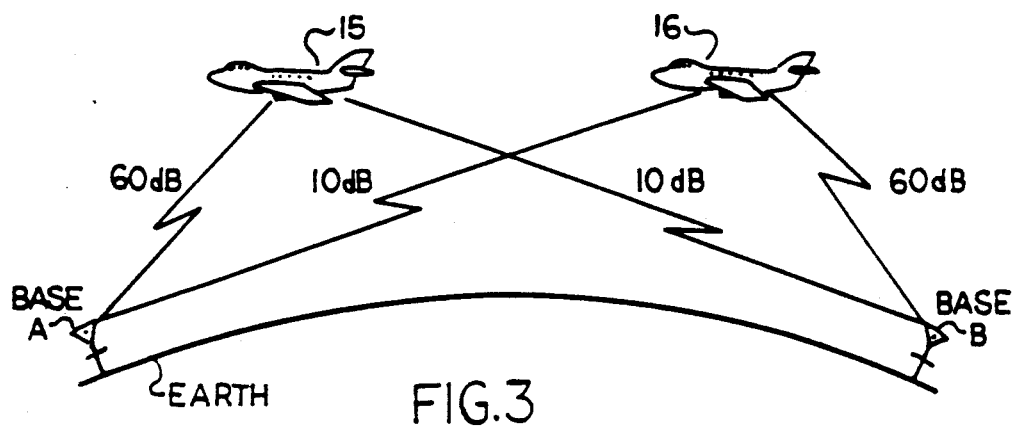
FIG. 3

AIR TO GROUND COMMUNICATIONS SYSTEM AND METHOD

BACKGROUND OF INVENTION

Airline passengers have recently been given the opportunity of making telephone calls from airplanes. Presently the cost for making such calls is relatively high. However, as in most applications of communication systems, the cost for making the calls will decrease, and more people will use the system. However, the frequency allocated for air to ground communications is a relatively limited (narrow) spectrum, hence the spectrum will soon become overcrowded thereby resulting in substantial delays for establishing telephone communications.

There are various techniques and methods for more efficiently utilizing the available spectrum assigned to each communications medium. A recent improvement in cellular technology generally has been the provision of digital modulation schemes which effect a significant increase in spectral capcity. Another recent improvement in cellular technology to date has been the provision of patterns of directional antennas that permit tight reuse patterns. The extra dB of interference protection offered by such antennas permits some ingenius patterns that are very efficient with respect to frequency reuse.

Still another innovation of importance in cellular technology is the method of "cell splitting". Basically, users very near their base sites do not need as much signal to noise protection so that these users can be combined into sets with different safety factors and cell patterns, as compared to users who are far away from their base sites.

One of the most important improvements in cellular communication is the recently developed system that provides frequency assignment independently of pre-set geographical cell patterns. The system performs calculations in real time to optimally allocate the channels to achieve the greatest of all frequency spectrum utilization. This system operates with actual signal strengths received, as opposed to a preplanned cellular pattern, and thus permits a totally freeform assignment that fully utilizes the allocated spectrum. The digital modulation schemes mentioned above can be utilized with this latter system to achieve spectrum utilization factors of eight or more to one compared to the prior art systems.

SUMMARY OF INVENTION

The present invention discloses a method of assigning frequency channels for telephone communication to and from aircraft which assignment is dependent on actual signal strengths received and independent of geographic cell patterns.

Applicant disclaims any portion of the term of any patent allowed based on this application after the expiration of U.S. Pat. No. 4,736,453 which patent is assigned to the same entity as the present invention.

DRAWINGS

The foregoing features and advantages of the present invention will be apparent from the following more particular description of the invention. The accompanying drawings, listed hereinbelow, are useful in explaining the invention.

FIGS. 1, 2, and 3 are sketches (not to scale) useful in explaining the inventive system and method.

DETAILED DESCRIPTION OF INVENTION

Present air to ground communications systems utilize geographic cell pattern systems essentially identical to cellular radio telephone land mobile systems, which are known in the art such as in U.S. Pat. Nos. 4,485,486, 4,144,411, 4,144,996. An improvement over the cellular radio telephone land mobile systems is disclosed in U.S. Pat. No. 4,736,453 which assigns frequency channels to specific mobiles independently of geographic cell patterns and based on interference or hurt matrices responding to signal strength parameters. The disclosure in U.S. Pat. No. 4,736,453 is incorporated herein by reference. The present invention is an improvement over the disclosure in U.S. Pat. No. 4,736,453.

It has been found that in aircraft (airplanes) flying at different altitudes the propagation signal pattern in real time is in the form of a three dimensional inverted cone pattern, see FIG. 1. The size of the cone pattern is approximately proportional to the height of the aircraft. Note that aircraft flying at different altitudes require greater or lesser utilization of the geographic spectrum resource depending upon the distance location from the base and the altitude of each particular aircraft. As an example, calls originated from aircraft on the ground in airports take very little of the geographic spectrum resource because those frequencies can be reused at the next airport, perhaps even in the same city. However, as the aircraft takes off and gains altitude, the potential frequency reuse is automatically decreased.

Refer to FIG. 2 which indicates aircraft flying at different altitudes (heights). Assume the aircraft 11 is flying at a height of 60,000 feet and the distance to the horizon is 280 miles; the aircraft labeled 12A and 12B are flying at 20,000 feet and the distance to the horizon is 102 miles; and the aircraft labeled 14A, 14B, 14C, and 14D are flying at 4,000 feet and the distance to the horizon is 72 miles.

| Height in Feet | Distance to Horizon in Nautical Miles |
|---|---|
| 2,000 | 51.2 |
| 4,000 | 72.4 |
| 8,000 | 102.3 |
| 20,000 | 161.8 |
| 40,000 | 228.8 |
| 60,000 | 280.2 |

As is known:

$$\text{Pi Radius}^2 = \text{Area}$$

Therefore aircraft 11 flying at 60,000 feet would transmit over (cover) an area as follows:

$$3.14 \times 280 \times 280 = 246,000 \text{ Miles}$$

In this case of aircraft 11 there is very little frequency reuse potential.

The aircraft 12A and 12B each flying at 20,000 feet would each cover an area as follows:

$$3.14 \times 162 \times 162 = 82,500 \text{ Miles}$$

In this case of aircraft 12A and 12B there is a potential of some frequency reuse.

The aircraft 14A, 14B, 14C and 14D flying at 4,000 feet would cover an area as follows:

3.14×72×72=16,300 Miles

In this case of aircraft 14A, 14B, 14C, and 14D there is a potential of large frequency reuse.

It is possible to assign 15 or 16 low flying aircraft to the same frequency channel that would be utilized (consumed) by one high flying aircraft such as the SST. Naturally, it is unlikely that the system would have 16 low flying aircraft that would be spaced ideally, but it does establish the concept that considerable frequency reuse is possible.

Refer now to FIG. 3 which shows two aircraft that are relatively close to each other such that frequency reuse would normally not be attempted. Aircraft 15 has a direct line of sight to Base A and aircraft 16 has a direct line of sight to Base B. Therefore, aircraft 15 receives a good (desired) signal (i.e., 60 dB over threshold) from Base A and aircraft 16 receives a good (desired) signal (i.e., 60 dB over threshold) from Base B. Assume that alternate communication path (aircraft 15 to Base B and aircraft 16 to Base A) extends over the horizon, and is not in a direct line of sight, the signal strength received is weak, a typical example might be 10 dB over threshold. In the example of FIG. 3, a difference between the desired and undesired signals is 50 dB; and, since it normally takes about 15 dB amplitude signal to capture a source, frequency reuse is possible.

In FIG. 2, frequency reuse is enhanced by assigning or placing lower flying aircraft together on one frequency channel, and setting aside other frequency channels for higher flying aircraft. The selected channels are then assigned based upon an analysis of signals received without reference to absolute locations. The system periodically analyzes the myriad of assignment combinations, and then selects assignments at that particular instance of time that maximize the number of conversations, and prohibits any cross talk. This analysis and re-analysis assignment and re-assignment is continuously being made.

The inventive system is thus a signal strength responsive system and it supports different size or area coverage for each communications source. As indicated in FIG. 2, the area of coverage is dependent on the height of the aircraft. In the case depicted in the sketch of FIG. 2, the inventive system assigns the same frequency channel as disclosed in U.S. Pat. No. 4,736,453 to aircraft 12A and 12B, and other channels to aircraft 14A, 14B, 14C, and 14D to maximize the number of conversations while still prohibiting cross talk. Note also that the frequency channel assigned to aircraft 12A can also be concurrently assigned and reused by aircraft 14C and 14D. Likewise the frequency channel assigned to aircraft 12B can be concurrently assigned to aircraft 14A and 14B.

In the cases shown in FIGS. 2 and 3 there is no geographical cell pattern and no assigned base location; rather, assignment of the frequency channels is made dependent on the amplitude of the received signal and the altitude of the aircraft.

In a first embodiment of the invention a major increase in spectrum efficiency is obtained by combining aircraft flying at lower altitudes onto the same channel, and setting aside clear channels for the higher flying aircraft. In this embodiment, the actual altitude of the aircraft from any suitable source is utilized as an imput to the matrix, and creates categories of aircraft such as for example:

(a) Aircraft flying below 5,000 feet
(b) Aircraft flying between 5,000 and 15,000
(c) Aircraft flying at over 15,000 feet The channels are divided into groups corresponding to the above listed categories. Because of the different "distance to horizon" for the worst case of each of the above categories, each category has different requirements for safety factors.

This approach effectively combines low flying aircraft onto channels with great potential for frequency reuse. Because the distance in miles between the ground base sites for these low flying aircraft is smaller, there will be a greater number of cells (or sites) and consequently greater frequency reuse on these channels.

In another embodiment the altitude of the aircraft is not utilized and the assignment procedure assigns aircraft to channels dependent on analyzing actual signals received as disclosed in the above cited U.S. Pat. No. 4,736,453.

Extra base sites permit greater frequency reuse, and thus greater spectrum efficiency in areas where such reuse is required. For example, extra base sites are added near airports, near the major cities, and along the major air routes, to increase capacity.

While the invention has been particularly shown and described with reference to a preferred embodiment thereof, it will be understood by those skilled in the art that various changes in form and details may be made therein without departing from the spirit and scope of the invention.

I claim:

1. In a radio telephone communications systems for selectively providing air-to-ground communications between a plurality of bases and a plurality of aircraft, wherein said aircraft provides respective signal transmitting patterns substantially as an inverted cone coverage covering areas dependent upon the height of the transmitting aircraft, the method of assigning frequency channels based upon evaluating all communicating signals present in the system and assigning a channel to each aircraft which does not interfere with a signal from any other aircraft or base site, and including the steps of assigning channels based upon the amplitudes of signals received at base sites independently of locations and altitudes of the aircraft.

2. A method as in claim 1 including the steps of assigning selected channels to aircraft flying at relatively lower altitudes, and assigning other channels to aircraft flying at relatively higher altitudes.

3. A radio telephone communications system selectively providing air-to-ground communications between a plurality of bases each having transmitters and receivers and a plurality of aircraft each having transmitters and receivers, transmitting means for providing signal transmitting patterns from said aircraft each pattern being substantially an inverted cone and covering areas on the ground dependent upon the height of the aircraft, means for assigning frequency channels for transmission and reception based upon the amplitude of signals received at base sites independently of locations and altitudes of aircraft, means evaluating all communicating signals present in the system, and means for assigning a channel to each aircraft to provide a coverage which does not interfere with signals from any other aircraft or base site.

* * * * *